United States Patent [19]
Rudolph et al.

[11] Patent Number: 4,778,225
[45] Date of Patent: Oct. 18, 1988

[54] BRAKE VACUUM MODULATOR TRACTION CONTROL WITH PRESSURE SOURCE VARIABLE AS FUNCTION OF ENGINE LOAD DURING INCIPIENT WHEEL SPIN CONDITIONS

[75] Inventors: Robert S. Rudolph, Osceola; Thomas J. Hoffman; Jerry L. Cage, both of Granger; Michael E. Gatt, Osceola, all of Ind.

[73] Assignee: Allied-Signal Inc., Morristown, N.J.

[21] Appl. No.: 83,491

[22] Filed: Aug. 10, 1987

[51] Int. Cl.⁴ .................... B60T 8/44; B60K 17/356
[52] U.S. Cl. .................... 303/114; 180/197; 180/244; 188/356; 188/181 A; 303/93; 303/100; 303/119; 60/545; 91/32
[58] Field of Search .............. 303/114, 93, 111, 110, 303/113, 119, 116, 61-63, 100, 99; 180/197, 282, 244; 188/356, 357, 353, 181; 91/6, 16, 32, 376 R; 192/3 H; 60/545, 534

[56] References Cited

U.S. PATENT DOCUMENTS

| | | | |
|---|---|---|---|
| 3,449,019 | 6/1969 | Walker | 303/114 |
| 3,460,439 | 8/1969 | Cripe | 91/32 X |
| 3,506,958 | 4/1970 | Kawabe | 303/1 X |
| 3,523,713 | 8/1970 | Okamoto et al. | 60/545 X |
| 3,608,982 | 9/1971 | Inada et al. | 303/114 |
| 3,827,762 | 8/1974 | Ives | 303/114 |
| 3,871,497 | 3/1975 | Bessiere | 60/545 X |
| 4,022,112 | 5/1977 | Putt et al. | 91/376 R |
| 4,175,794 | 11/1979 | Pauwels | 303/105 |
| 4,326,608 | 4/1982 | Pauwels | 188/181 T |
| 4,589,511 | 5/1986 | Leiber | 180/244 X |
| 4,667,471 | 5/1987 | Fulmer et al. | 91/32 X |
| 4,681,196 | 7/1987 | Fulmer et al. | 60/545 X |
| 4,685,547 | 8/1987 | Ohashi et al. | 180/197 X |
| 4,702,336 | 10/1987 | Seibert et al. | 303/103 X |

Primary Examiner—Douglas C. Butler
Attorney, Agent, or Firm—Ken C. Decker

[57] ABSTRACT

A vehicle braking system equipped with an adaptive braking system with traction control to control drive wheel slip during vehicle acceleration includes a conventional vacuum brake booster having a vacuum chamber normally connected to engine manifold vacuum and an atmospheric chamber connected to the vacuum chamber when the brakes are released but which is connected to atmosphere when a brake application is effected. The traction control system includes a control unit which actuates a solenoid valve under wheel slip conditions during vehicle acceleration to cut off communication between the vacuum chamber and engine manifold vacuum. The traction control system also cuts off communication between the vacuum chamber and the atmospheric chamber and initiates communication of the atmospheric chamber directly to engine manifold vacuum, thereby effecting a brake application proportional to engine manifold vacuum, which varies as a function of engine power.

7 Claims, 1 Drawing Sheet

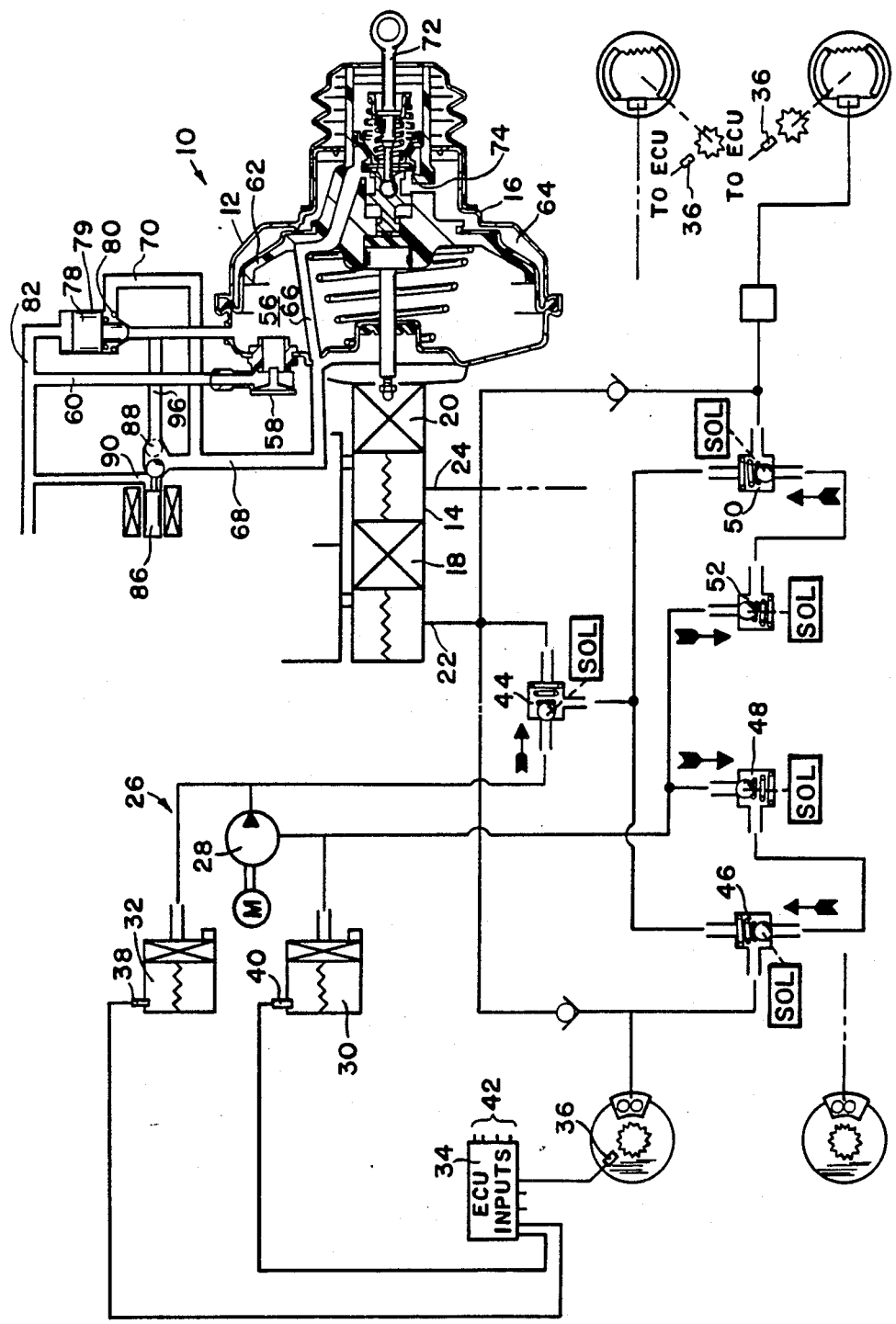

BRAKE VACUUM MODULATOR TRACTION CONTROL WITH PRESSURE SOURCE VARIABLE AS FUNCTION OF ENGINE LOAD DURING INCIPIENT WHEEL SPIN CONDITIONS

BACKGROUND OF THE INVENTION

The present invention relates to traction control systems and in particular to a traction control system for use on a motor vehicle which system uses a conventional vacuum brake booster and the vehicle's engine manifold vacuum to effect traction control in a vehicle that is not otherwise equipped with an independent source of pressurized braking fluid.

Traction control systems, closely related to anti-lock braking systems, are systems which utilize the vehicle's brakes to absorb a portion of the driving force applied to the driven wheels of the vehicles to obviate slipping of the wheels during acceleration. Typically, these systems utilize wheel speed sensors, brake pressure modulators, an electronic control unit, and the like components of an anti-lock braking system to sense behavior of the vehicle's driven wheels and to generate control signals necessary to prevent wheel spin.

In one type of anti-lock braking system, commonly referred to as a pump-back system, the vehicle's vacuum boosted master cylinder is utilized as a source of pressurized braking fluid during anti-lock braking system operation. A small pump is used to replenish brake fluid lost from the system during brake pressure decay cycles. This type of system is not readily adaptable to traction control because the vehicle's brakes are not used during acceleration, and accordingly, no source of pressurized brake fluid is available to operate the vehicle brakes. Traction control systems which work in conjunction with a pump-back anti-lock braking system have been proposed, but such systems typically require the addition of a full-time hydraulic pump, additional brake pressure modulating valves and similar components. This produces a system which is effective but also expensive and complex. There therefore exists a need for a traction control system which is particularly well adapted for use in conjunction with pump-back anti-lock braking systems and in particular to such a system that does not require the addition of a significant number of components.

Broadly, the present invention is a traction control system wherein an electronically controlled solenoid valve and related pneumatic circuitry apply the variable vacuum of a motor vehicle's intake manifold to that side of the diaphragm of the vehicle's vacuum booster normally exposed to atmospheric pressure during braking to provide initial actuation of the master cylinder during traction control conditions. The pressurized braking fluid generated by the master cylinder is selectively applied to only the driven wheels of the vehicle during traction control. Because the intake manifold vacuum varies indirectly in proportion to engine power during acceleration, application of this vacuum provides a variable pressure source of braking fluid in which the available traction absorbing braking torques vary in direct proportion to the torques required during acceleration thereby obviating jerky, uneven, or excessive traction control torque on the vehicle's wheels.

In a specific embodiment of the invention, the system includes a master cylinder having a vacuum booster. At least one brake wheel cylinder associated with a driven wheel of a motor vehicle is operatively connected to the master cylinder. Means are provided responsive to the rotational behavior of the vehicle's wheels for generating traction control signals. Pneumatic switching means are provided for connecting the side of the vacuum booster diaphragm normally exposed to atmospheric pressure to the vehicle's manifold vacuum. Brake pressure modulating means are connected to the traction control signal generating means for modulating the application of pressurized braking fluid from the master cylinder to the wheel brake cylinders of the vehicle's driven wheels.

It is therefore an object of the invention to provide an improved traction control system.

Another object of the invention is to provide such a system adaptable for use with pump-back anti-lock braking systems.

Still another object of the invention is to provide a traction control system in which the variable of vacuum engine manifold pressure is utilized as a variable vacuum source for the vacuum booster of the vehicle's braking system during traction control operation.

Another object of the invention is to provide a traction control system in which traction absorbing torque provided by the vehicle's braking system varies in direct proportion to available power for acceleration.

Yet another object of the invention is to provide a traction control system operable in conjunction with a pump-back anti-lock braking system using an existing pump and brake pressure modulator means.

Still another object of the invention is to provide such a system which is substantially fail-safe, simple, and economical to produce.

BRIEF DESCRIPTION OF THE DRAWING

These and other objects and purposes of the invention and the invention itself will be best understood in view of the following detailed description thereof taken in conjunction with the appended drawing wherein there is shown a traction control system, partially in schematic, in accordance with the present invention.

DESCRIPTION OF THE PREFERRED EMBODIMENT

Referring now to the drawing, there is shown a traction control system indicated generally at 10. The system includes a conventional vacuum boosted master cylinder 12 which includes a master cylinder 14 and vacuum booster assembly 16.

The master cylinder 14 is typically configured to include primary and secondary pistons 18, 20 which provide pressurized braking fluid to primary and secondary brake circuits 22, 24. Such master cylinders are well known in the art, such as cylinder being disclosed, for example in U.S. Pat. No. 4,474,005 commonly assigned with the present invention. Similarly, the vacuum booster assembly 16 is well known in the prior art, such a vacuum booster assembly being disclosed, for example, in U.S. Pat. No. 4,022,112 and commonly assigned with the present invention.

Connected to the master cylinder 14 is an anti-lock braking system of the pump-back type, this system being fully described in copending U.S. patent application Ser. No. 060,194 filed June 10, 1987 in the name of George Emerson Brown and commonly assigned with the present invention, the disclosure of which is specifically incorporated herein by reference. Broadly, the anti-lock braking system incorporates a pump assembly 26 which includes a motor driven pump 28, sump 30 and accumulator 32. An electronic control unit (ECU) 34 receives input signals via devices such as wheel speed inputs via sensors 36 and various pressure and position switches such as switches 38, 40, associated with the accumulator and sump. Based upon information derived from these signals, the ECU 34 generates output signals at output terminals 42 to control a plurality of solenoid actuated valves 44, 46, 48, 50, and 52, the valves for only one circuit of the system being shown for simplicity, the other circuit being identical. The valve automatically control the application of braking forces to prevent wheel skid.

The vacuum booster assembly 16 includes a vacuum chamber 56 connected through a one-way check valve 58 to an engine intake manifold via a vacuum line 60. The vacuum chamber 56 is divided by a conventional flexible diaphragm assembly 62 to define a second vacuum chamber 64. The chamber 64 is normally connected to the same source of vacuum by means of an internal vacuum line 66 and external vacuum lines 68, 70. Under normal non-braking operation, vacuum chambers 56 and 64 are simultaneously exposed to substantially equal vacuum. When the vehicle's brakes are applied by means of a pedal (not shown) attached to plunger-rod assembly 72, chamber 64 is exposed to atmospheric pressure through control port 74 applying pressure to the right (as viewed in the drawings) surface of the diaphragm 62 to provide a power boost to the master cylinder 14. This vacuum booster assembly 16 is in all respects conventional.

Interposed in vacuum line 70 is a bypass valve 78 shown in its normal position wherein it provides communication between vacuum chamber 56 and vacuum chamber 64. The valve is maintained in this posiiton by means of a spring 80. Bypass valve 78 will operate to a closed position in response to a reduced pressure in line 70 or an increased pressure in line 82. A three-way, solenoid actuated control valve 86 has a normally open inlet 88 connected to the bypass valve 80, a normally closed inlet 90 connected to the engine vacuum source, and its outlet connected in common to the vacuum line 68 and 70. Under normal braking conditions, the vacuum booster master cylinder assembly 12 provides braking as described in the above-referenced U.S. Pat. No. 4,022,112. During anti-lock braking conditions, the system operates as disclosed in above-identified U.S. patent application Ser. No. 060,194 filed June 10, 1987, and commonly assigned herewith.

In the event that the electronic control unit 34 senses the need to energize the traction control system, typically the result of sensing an imminent wheel spin condition during acceleration, an appropriate control signal is outputted by terminals 42 to the solenoid actuated three-way valve 86. This causes the valve to close the vacuum connection between vacuum chamber 56 and 64 provided by vacuum lines 68 and 96. The vacuum in chamber 56 remains substantially constant by reason of the check valve 58. Vacuum chamber 64 is now, however, connected to the source of engine vacuum through valve 86. Accordingly, chamber 64 is now directly connected to the vehicle's intake manifold such that the pressure in vacuum chamber 64 will vary with the engine intake manifold pressure. Since this pressure in turn varies with engine throttle positions, the intake manifold pressure increasing as the throttle is open, pressure in the chamber 64 will increase therewith. This increase in pressure in chamber 64 will cause the diaphragm assembly 62 to move thereby applying a boosting force to the master cylinder 14 that is substantially proportional to engine load. Simultaneously, pump assembly 28 is energized by the electronic control unit to provide a continuing source of pressurized braking fluid to the system. Typically, the pump assembly 28 is rendered operative in response to the electronic control unit 34 sensing that the master cylinder 14 has been actuated.

Simultaneously, bypass valve 78 will automatically close since the pressure in the vacuum chamber 56 will be less than manifold vacuum as the vehicle's accelerator is opened. In the event that it is determined that traction control is no longer required, valve 86 operates to its normal position and equal vacuum is applied to both sides of the vacuum assembly 62. In the event that solenoid valve 86 should stick or otherwise be inoperative, bypass valve 78 will open in response to equalization of the vacuum in the intake manifold of the vehicle with that in the vacuum chamber 56 coupled with the action of valve 78 spring 79. It will thus be seen that bypass valve 79 functions as a fail-safe device that effects the system only in the event of a failure of valve 86.

From the above description, it will now be apparent from the present invention utilizes the engine manifold pressure as a variable source of pressure to initially operate a conventional vacuum boosted master cylinder to effect traction control. It will further be recognized that the invention obviates a problem of applying maximum differential pressure to the diaphragm assembly 62 during traction control since during traction control the manifold pressure will increase in proportion to engine load. This inturn insures that the differential pressure applied to the vacuum diaphragm assembly 62 will vary in proportion to this load such that maximum boost will be available during heavy load conditions and minimal differential pressure will be applied under light load conditions. This insures that the system will not produce wheel lock or noticeable harshness during operation.

Although the present invention has been illustrated and described in connection with example embodiments, it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

What we claim is:

1. A traction control system comprising: a master cylinder and a vacuum booster, said vacuum booster having a diaphragm assembly dividing the vacuum booster into a pair of chambers, said diaphragm assembly being operatively connected to said master cylinder for increasing the pressure generated by said master cylinder in proportion to a differential pressure applied to said diaphragm, at least one wheel brake cylinder associated with a driven wheel of a motor vehicle and operatively connected to said master cylinder, means responsive to the rotational behavior of said vehicle for generating traction control signals, modulating means operatively connected to said traction control signal generating means for controlling the application of pressurized braking fluid by said master cylinder to said wheel cylinder in response to said traction control signals, and valve means operative in response to said traction control signals for connecting one of said chambers to a pressure source variable as a function of engine load during incipient wheel spin conditions during vehicle acceleration, wherein said one chamber is only connected to atmosphere when a brake application is effected through operation of the brake pedal 2. The system of claim 1 wherein said pressure source includes the intake manifold of the engine of said vehicle.

3. The system of claim 2 further including a normally open bypass valve connecting the other chamber of said booster to said one chamber of said booster, said valve being connected to said pressure source and operable to a closed position when the pressure of said pressure source is greater than the pressure in said other chamber.

4. The system of claim 3 wherein said valve means includes a three-way solenoid actuated valve having its outlet connected to said one chamber of said booster, its normally open inlet port connected to the other chamber of said booster, and its normally closed inlet connected to said pressure source.

5. The system of claim 4 wherein said means for generating traction control signals includes a wheel speed sensor associated with each driven wheel of said vehicle, means for detecting an incipient wheel-spin condition, and means for determining that said spin condition is a function of acceleration.

6. The system of claim 5 wherein said other chamber is connected through a unidirectional valve to a source of vacuum, said one chamber being connected alternately to said source of vacuum and to atmosphere.

7. The system of claim 6 wherein said system includes a motor driven pump, said pump being rendered operable in response to movement of said master cylinder means.

* * * * *